(12) United States Patent
Sun

(10) Patent No.: US 11,439,906 B2
(45) Date of Patent: Sep. 13, 2022

(54) INFORMATION PROMPTING METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Dajia Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/922,884

(22) Filed: Jul. 7, 2020

(65) Prior Publication Data

US 2020/0330870 A1 Oct. 22, 2020

Related U.S. Application Data

(63) Continuation of application No. PCT/CN2019/079511, filed on Mar. 25, 2019.

(30) Foreign Application Priority Data

Jun. 1, 2018 (CN) .......................... 201810555839.X

(51) Int. Cl.
*A63F 13/5375* (2014.01)

(52) U.S. Cl.
CPC ................. *A63F 13/5375* (2014.09)

(58) Field of Classification Search
CPC .............. A63F 13/5375; A63F 13/5372; A63F 13/5378
See application file for complete search history.

(56) References Cited

U.S. PATENT DOCUMENTS

2014/0274410 A1* 9/2014 Maynard ............... A63F 13/533 463/42
2017/0193705 A1* 7/2017 Mullins ................. G06T 19/006
2020/0338449 A1* 10/2020 Fan ..................... A63F 13/5372

FOREIGN PATENT DOCUMENTS

CN 101727175 A 6/2010
CN 104740875 A 7/2015
(Continued)

OTHER PUBLICATIONS

League of Legends video game, published by Riot Games in 2009, as evidenced by YouTube video dated Feb. 13, 2013 at: https://www.youtube.com/watch?v=psu66XA2tLw (Year: 2009).*

(Continued)

*Primary Examiner* — James S. McClellan
(74) *Attorney, Agent, or Firm* — ArentFox Schiff LLP

(57) ABSTRACT

An information prompting method and apparatus, a storage medium, and an electronic device are provided. In an information prompting method of a game application, an operation instruction is obtained in a virtual scene of the game application in which a first virtual role is located. The operation instruction is generated in response to a marking operation, by a user of the first virtual role, on a virtual object at a first position. The virtual object is used by the first virtual role to complete a task in the virtual scene. A prompt identifier matching the virtual object is generated according to the operation instruction. The prompt identifier is used to notify a second virtual role of attribute information of the virtual object. The second virtual role belongs to a same team as the first virtual role. Further, the prompt identifier is displayed at the first position.

20 Claims, 9 Drawing Sheets

(56) References Cited

FOREIGN PATENT DOCUMENTS

| | | |
|---|---|---|
| CN | 106445588 A | 2/2017 |
| CN | 107368544 A | 11/2017 |
| CN | 107617213 A | 1/2018 |
| CN | 107648847 A | 2/2018 |
| CN | 107648848 A | 2/2018 |
| CN | 107694089 A | 2/2018 |
| CN | 107789837 A | 3/2018 |
| CN | 107832000 A | 3/2018 |
| CN | 107837530 A | 3/2018 |
| CN | 107890664 A | 4/2018 |
| CN | 107890669 A | 4/2018 |
| CN | 107899241 A | 4/2018 |
| CN | 107899246 A | 4/2018 |
| CN | 108744512 A | 11/2018 |
| GB | 2505877 A | 3/2014 |

OTHER PUBLICATIONS

International Search Report Issued in Application PCT/CN2019/079511 dated Jun. 18, 2019, citing references AO-AS therein, with English Machine Translation (7 pages).

Written Opinion Issued in Application PCT/CN2019/079511 dated Jun. 18, 2019 (4 pages).

Office Action dated Jul. 27, 2021 issued in corresponding Chinese patent application No. 201810555839 with English translation (citing documents AX-AY) (21 pages).

"How to Mark Maps, People, Remind Fellow Teammates to Meet at a Specified Place, and How to Support the Different Operations in League of Legends (LOL)" https://zhidao.baidu.co m/question/541020198.ht ml?sort=ll&rn=S&pn=0# wgt-answers, Apr. 14, 2013 (2 pages).

Bubble Gum "How to Property Use Markers in League of Legends (LOL)" https://zhinan.sogou.com/guide/detail/?id=1610014794&utm_source=sg.outsourcing&rcer=Q9PEA OgL5c3SCk8n#gid=l&pi d=8, Jul. 28, 2016 (4 pages).

\* cited by examiner

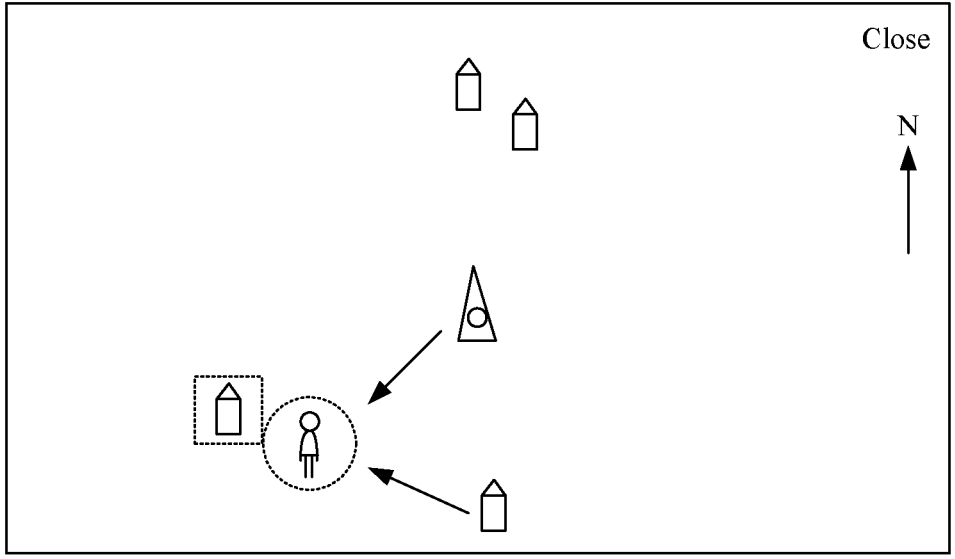

FIG. 8

| Obtain, in a virtual scene displayed in a human-computer interaction interface corresponding to a first virtual role, a moving track generated by performing a move operation in the human-computer interaction interface, the moving track being used for prompting an action track that a virtual role in a faction to which the first virtual role belongs is to refer to during task execution | S902 |

| Display the moving track in the human-computer interaction interface | S904 |

FIG. 9

INFORMATION PROMPTING METHOD AND APPARATUS, STORAGE MEDIUM, AND ELECTRONIC DEVICE

RELATED APPLICATION

This application is a continuation of International Application No. PCT/CN2019/079511, filed on Mar. 25, 2019, which claims priority to Chinese Patent Application No. 201810555839.X, entitled "INFORMATION PROMPTING METHOD AND APPARATUS, STORAGE MEDIUM, AND ELECTRONIC DEVICE" and filed on Jun. 1, 2018. The entire disclosures of the prior applications are hereby incorporated by reference in their entirety.

FIELD OF THE TECHNOLOGY

This application relates to the field of computers, including an information prompting method and apparatus, a storage medium, and an electronic device.

BACKGROUND OF THE DISCLOSURE

In many terminal applications, to complete a virtual task specified in a virtual scene, virtual roles belonging to the same faction or team usually needs to reach a designated location, to jointly complete a given human-computer interaction operation in the virtual task.

Currently, a virtual role usually uses marks to display a unique destination identifier in a map matching the virtual scene to prompt other virtual roles to reach a destination marked by the destination identifier. However, the destination identifier carries only location information of the destination for prompting the virtual roles scattered in different places to assemble at a specified point, and there is a problem of relatively monotonous displayed information.

For the foregoing problem, no effective solution has been provided yet.

SUMMARY

Embodiments of this application provide an information prompting method and apparatus, a storage medium, and an electronic device, to resolve at least a technical problem of monotonous displayed information due to that only a destination identifier is displayed in a map.

According to an aspect of the embodiments of this application, an information prompting method of a game application is provided. In the method, an operation instruction is obtained in a virtual scene of the game application in which a first virtual role is located. The operation instruction is generated in response to a marking operation, by a user of the first virtual role, on a virtual object at a first position. The virtual object is used by the first virtual role to complete a task in the virtual scene. A prompt identifier matching the virtual object is generated according to the operation instruction. The prompt identifier is used to notify a second virtual role of attribute information of the virtual object, the second virtual role belonging to a same team as the first virtual role. Further, the prompt identifier is displayed at the first position.

According to another aspect of the embodiments of this application, an information prompting method of a game application is provided. In the method, in a virtual scene displayed in a human-computer interaction interface corresponding to a first virtual role, a moving track generated by performing a movement operation in the human-computer interaction interface is obtained. The moving track is used to notify a virtual role of an action track that the virtual role in a team of the first virtual role is to refer to during task execution. The moving track is displayed in the human-computer interaction interface.

According to still another aspect of the embodiments of this application, an information prompting apparatus is further provided. The information processing apparatus includes circuitry configured to obtain an operation instruction in a virtual scene of a game application in which a first virtual role is located. The operation instruction is generated in response to a marking operation, by a user of the first virtual role, on a virtual object at a first position. The virtual object is used by the first virtual role to complete a task in the virtual scene. The processing circuitry is configured to generate a prompt identifier matching the virtual object according to the operation instruction. The prompt identifier is used to notify a second virtual role of attribute information of the virtual object, the second virtual role belonging to a same team as the first virtual role. The processing circuitry is further configured to display the moving track in the human-computer interaction interface.

According to still another aspect of the embodiments of this application, an information prompting apparatus is further provided. The processing circuitry is configured to obtain, in a virtual scene displayed in a human-computer interaction interface corresponding to a first virtual role, a moving track generated by performing a movement operation in the human-computer interaction interface. The moving track is used to notify a virtual role of an action track that the virtual role in a team of the first virtual role is to refer to during task execution. The processing circuitry is further configured to displaying the moving track in the human-computer interaction interface.

According to still another aspect of the embodiments of this application, a non-transitory computer-readable storage medium is further provided. The non-transitory computer-readable storage medium storing instructions which when executed by a computer cause the computer perform any of the information prompting methods.

According to still another aspect of the embodiments of this application, an electronic device is further provided, including a memory, a processor, and a computer program stored on the memory and being executable on the processor, the processor performing any of the information prompting methods by using the computer program.

According to still another aspect of the embodiments of this application, a computer program product including an instruction is further provided, the computer program product, when being run on a computer, causing the computer to perform any of the information prompting methods.

The technical solutions provided in the embodiments of this application have the following advantages:

In the embodiments of this application, an operation instruction is obtained in a virtual scene in which a first virtual role is located, the operation instruction being generated by performing, by the first virtual role, a mark operation on a virtual object at a first position; a prompt identifier matching the virtual object is generated according to the operation instruction; and the prompt identifier is displayed at the first position. The virtual object is used for assisting the first virtual role to complete a task specified in the virtual scene. The prompt identifier is used for prompting attribute information of the virtual object to a second virtual role belonging to the same faction as the first virtual role. In the foregoing method, after the operation instruction generated for the mark operation performed on the virtual object at the first position is obtained, the prompt identifier matching the virtual object is generated according to the operation instruction. Therefore, the generated prompt identifier changes according to different operation instructions, thereby enriching the prompt identifier displayed in a map, and resolving a technical problem of monotonous displayed information due to that only a destination identifier is displayed in the map.

In addition, the technical solution can resolve a problem of inconvenient communication when it is inconvenient for a user to communicate by voice, or when continuous visual display of a time period is needed for an event, thereby enriching a function of the map, so that the map can present richer information, thereby improving user experience.

BRIEF DESCRIPTION OF THE DRAWINGS

The accompanying drawings described herein are used for providing further understanding for this application and constitute a part of this application. Exemplary embodiments of this application and descriptions thereof are used for explaining this application and are not intended limit the scope of this application. In the accompanying drawings:

FIG. 8 is a schematic diagram of still another exemplary information prompting method according to an embodiment of this application.

FIG. 9 is a schematic flowchart of another exemplary information prompting method according to an embodiment of this application.

DESCRIPTION OF EMBODIMENTS

To make a person skilled in the art better understand solutions of this application, the following describes technical solutions in embodiments of this application with reference to the accompanying drawings in the embodiments of this application. The described embodiments are merely some rather than all of the embodiments of this application. All other embodiments obtained by a person of ordinary skill in the art based on the embodiments of this application shall fall within the protection scope of this application.

In the specification, claims, and accompanying drawings of this application, the terms "first", "second", and so on are intended to distinguish between similar objects rather than describe a specific order or sequence. It is to be understood that the data termed in this way are interchangeable in a proper case, so that the embodiments of this application described herein can be implemented in other orders than the orders illustrated or described herein. Moreover, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
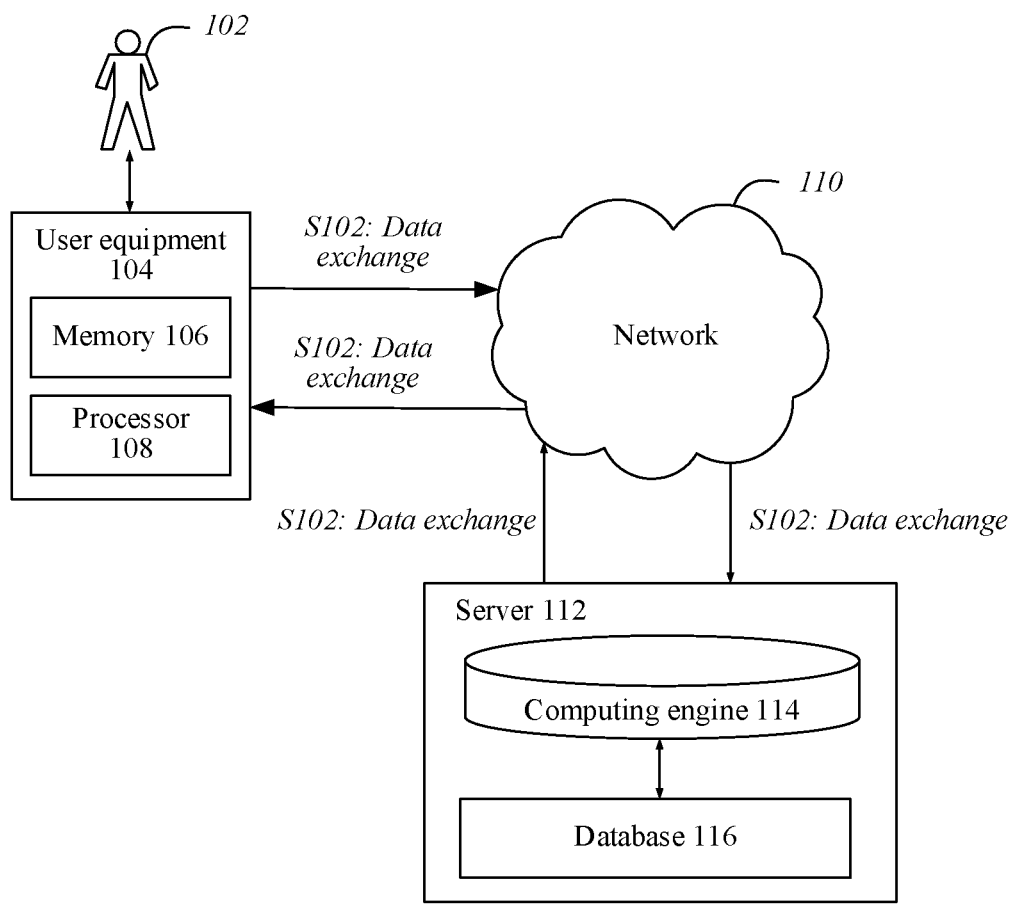
FIG. 1 is a schematic diagram of an application environment of an information prompting method according to an embodiment of this application.

According to an aspect of the embodiments of this application, an information prompting method is provided. Optionally, according to an optional implementation, the information prompting method may be applied to, but is not limited to, an environment shown in FIG. 1. A user 102 may perform human-computer interaction with user equipment 104. The user equipment 104 includes a memory 106 and a processor 108, and data exchange is performed between the user equipment 104 and a server 112 through a network 110 by performing step S102. A computing engine 114 in the server 112 is responsible for data computation, and computation data is stored in a database 116. The user equipment 104 obtains an operation instruction in a virtual scene displayed in a human-computer interaction interface corresponding to a first virtual role, the operation instruction being generated by performing, by the first virtual role, a mark operation on a virtual object at a first position, the virtual object being used for assisting the first virtual role to complete a task specified in the virtual scene. The user equipment 104 generates, according to the operation instruction, a prompt identifier matching the virtual object, the prompt identifier being used for prompting attribute information of the virtual object to a second virtual role belonging to the same faction (or team) as the first virtual role; and displays the prompt identifier at the first position.

In the related art, when a destination identifier is displayed in a map, usually, only a destination identifier of a destination location of another virtual role is displayed. Because only the destination identifier is displayed, displayed information is relatively monotonous. However, in this embodiment, after the operation instruction is obtained, the prompt identifier matching the virtual object is generated according to the operation instruction. Therefore, the generated prompt identifier changes according to different operation instructions, thereby enriching the prompt identifier displayed in a map.

Optionally, the information prompting method may be applied to, but is not limited to, a terminal that can perform interaction, for example, a mobile phone, a tablet computer, a notebook computer, or a PC. The network may include, but is not limited to, a wireless network or a wired network. The wireless network includes: Bluetooth, Wi-Fi, and other networks implementing wireless communication. The wired network may include, but is not limited to: a wide area network, a metropolitan area network, or a local area network. The server may include, but is not limited to, any hardware device capable of performing a computing service.

Figure 2:
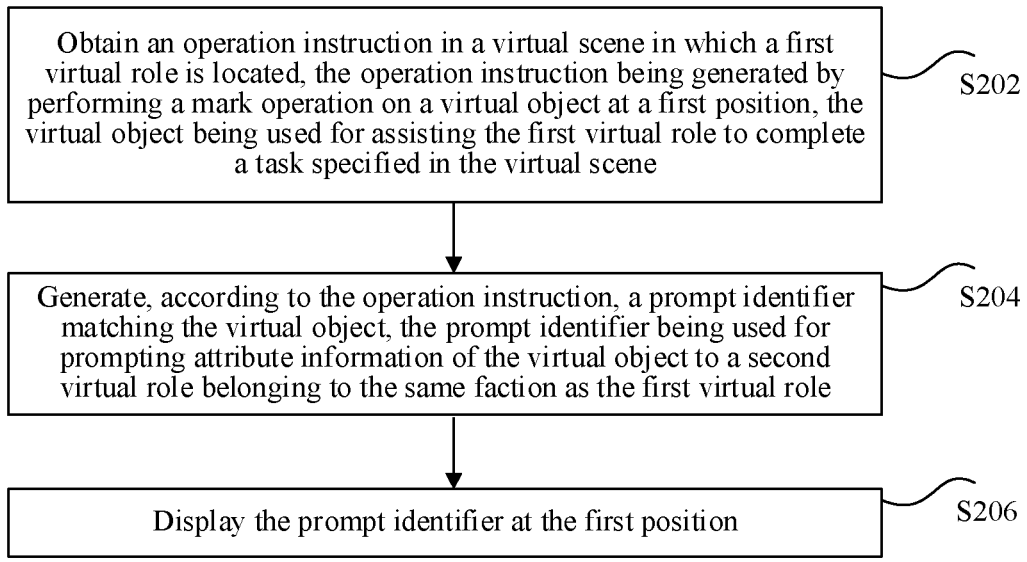
FIG. 2 is a schematic flowchart of an exemplary information prompting method according to an embodiment of this application.

Optionally, according to an optional implementation, as shown in FIG. 2, the information prompting method includes the following steps.

In step S202, an operation instruction in a virtual scene is obtained in which a first virtual role is located, the operation instruction being generated by performing, by the first virtual role, a mark operation on a virtual object at a first position, the virtual object being used for assisting the first virtual role to complete a task specified in the virtual scene. For example, the operation instruction is generated in response to a marking operation, by a user of the first virtual role, on a virtual object at a first position, the virtual object being used by the first virtual role to complete a task in the virtual scene.

In step S204, a prompt identifier matching the virtual object is generated according to the operation instruction, the prompt identifier being used for prompting attribute information of the virtual object to a second virtual role belonging to the same faction as the first virtual role. For example, a prompt identifier matching the virtual object is generated according to the operation instruction, the prompt identifier being used to notify a second virtual role of attribute information of the virtual object, the second virtual role belonging to a same team as the first virtual role.

In step S206, the prompt identifier is displayed at the first position.

Optionally, the information prompting method may be applied to, but is not limited to, the field of gaming, the field of simulation training, or the field of navigation. The virtual object, operation instruction, and the like can change according to different application fields, and exemplary applications of the method to different fields is described in detail below.

Using the field of gaming as an example, the virtual scene is a game scene, the virtual object may be a resource in a game, the mark operation may be a click operation or a screen touch operation, the operation instruction may be moving towards the resource, and the attribute information may be an object type of the virtual object in the game scene, for example, a resource type such as attack, defense, or supply, and may alternatively be a track towards the resource. Based on this, the prompt identifier may be a flashing pattern, and a type of the resource may be represented by using the flashing pattern. The attribute information may alternatively be a moving track. During gaming, after finding a resource in the game, a first user controlling the first virtual role performs a click operation on the resource, to indicate that the user needs to move towards the resource. After the first user performs the click operation, a moving track is generated, and the moving track is displayed at the first position, so that a second user controlling a second virtual role belonging to the same faction as the first virtual role may move towards the resource according to the moving track. After the first user performs the click operation, a flashing pattern may further be generated, so that the second user controlling the second virtual role can determine the resource type and obtain the resource according to a requirement of the second user.

Therefore, this solution can resolve a problem of inconvenient communication when it is inconvenient for a user to communicate by voice, or when continuous visual display of a time period is needed for an event, thereby resolving a problem that a tactical will of a player is expressed in a monotonous way, and players can only communicate by voice. The player can more conveniently mark a related resource prop in a map for teammates, and clearly present a tactical intention in a visual way, thereby facilitating communication with the teammates. In addition, the function of the map is enriched, so that the map can display more information of concern to the player, thereby improving game experience of the player.

Descriptions are provided below by using the field of simulation training as an example. The first virtual role may be a virtual role corresponding to an account that a first trainer logs in to, the virtual scene may be a simulation training scene, the virtual object may be a hostage in the virtual scene, the mark operation may be a screen touch track operation, and the prompt identifier may be an attack route. During simulation training, after the first trainer logs in to the account, a position of the hostage is obtained in a training interface displayed in the human-computer interaction interface. The first trainer controls the first virtual role to perform a screen touch operation at the position of the hostage, to obtain a training policy, such as strategies corresponding to stages of attack, defense, ambush, and infiltration, and displays the training policy at the first position.

Optionally, there are different types of virtual objects, and the prompt identifier changes according to different types of the virtual object. After the operation instruction is obtained, the method further includes: parsing the operation instruction, to determine an object type of the virtual object; and generating the prompt identifier matching the object type, the prompt identifier including an attribute icon corresponding to the virtual object.

For example, descriptions are provided still with reference to the foregoing field of gaming. During a gaming process, when the prompt identifier is generated according to the operation instruction of the first user operating the first virtual role, the operation instruction includes the object type of the virtual object. The object type can represent an identity attribute of the virtual object. For example, the object type of the virtual object is an enemy, an ally, or a neutral. Different attribute icons are set according to the object types of the virtual objects, so that another user can determine information, such as the identity attribute of the virtual object, based on the attribute icon. For example, the enemy is represented by a red circle, the ally is represented by a green circle, and the neutral is represented by a yellow circle. When another user determines, by viewing the human-computer interaction interface, that the prompt identifier of the virtual object is a red circle, the user may determine that the virtual object is an enemy.

In this embodiment, the object type of the virtual object is determined by parsing the operation instruction, so that the prompt identifier matching the object type of the virtual object can be displayed, thereby improving display flexibility of the prompt identifier and enriching content of the prompt identifier.

Optionally, the operation instruction generated for performing the mark operation on the virtual object at a first position is obtained includes at least one of the following: obtaining the operation instruction generated by performing a mark operation on a mark button displayed in a human-computer interaction interface; obtaining a click instruction generated by performing a click operation on the virtual object; displaying a relationship establishment layer in response to the click instruction, the relationship establishment layer being used for instructing to establish an association relationship between the virtual object and the first virtual role; and obtaining the operation instruction generated by performing a mark operation on a mark button displayed in the relationship establishment layer.

Optionally, the mark button may be in the human-computer interaction interface from the beginning, so that the operation instruction is obtained after the mark button is pressed. Alternatively, after the click operation is performed on the virtual object, the relationship establishment layer is displayed, and the mark button is displayed in the relationship establishment layer. After the mark button displayed in the relationship establishment layer is pressed, the operation instruction is obtained.

Optionally, there may be one or more mark buttons. A scroll key may be set in a case that there is one mark button, and mark content of the mark button is changed according to the scroll key. In a case that there is a plurality of mark buttons, there are different types of mark content for different mark buttons.

Optionally, the performing a mark operation may be performing a tap operation on a touchscreen, or performing a mark operation by using a peripheral such as a mouse or a keyboard. For example, a click operation is performed by using a mouse, or a press-down operation is performed by using a keyboard.

Optionally, the prompt identifier may be any one or a combination of text, an image, an animation, and the like. For example, the prompt identifier may be a red triangle, a blue circle, or a flashing animation of a bullet.

Figure 3:
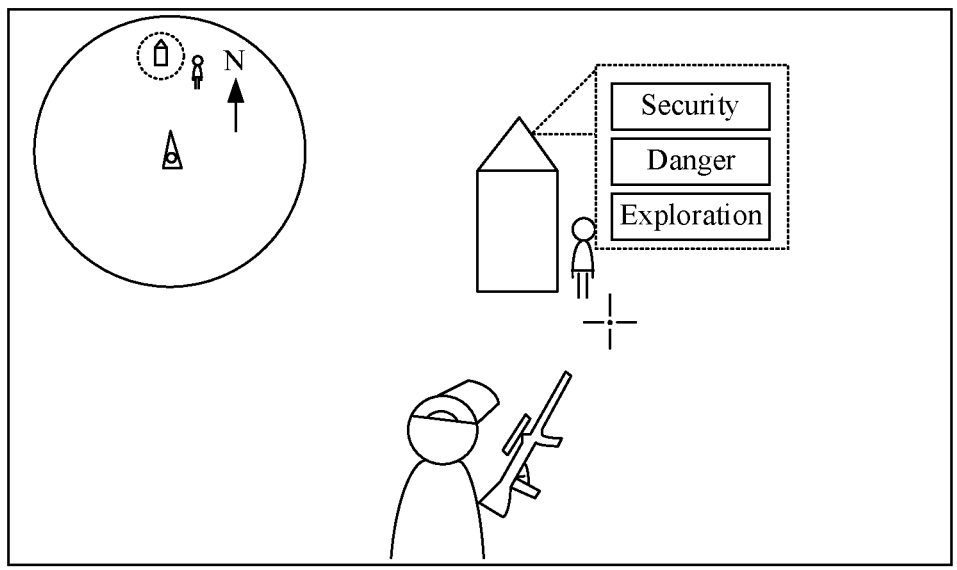
FIG. 3 is a schematic diagram of an exemplary information prompting method according to an embodiment of this application.

For example, descriptions are provided still with reference to the foregoing field of gaming. The prompt identifiers are warning circles of different colors. As shown in FIG. 3, FIG. 3 is a schematic diagram during a game process, and the virtual object is a house in a game. After the first user performs a click operation on the house, a relationship establishment layer is displayed at a position at which the click operation is performed, and a plurality of mark buttons are displayed in the relationship establishment layer. If the first user performs a click operation on a danger mark button, the prompt identifier generated according to the operation instruction is a warning circle that flashes in red. As shown in FIG. 3, the house in a minimap in FIG. 3 is marked with a warning circle that flashes in red. If the first user performs a click operation on a security mark button, a green warning circle may be displayed on the house in the minimap, to indicate security. If the first user performs a click operation on an exploration mark button, a yellow to-be-explored warning circle may be displayed on the house in the minimap.

FIG. 3 is an effect diagram after grayscale conversion. In an actual application, the prompt identifier may be specifically a warning circle of a color matching a button clicked by a user.

In this embodiment, the operation instruction generated by performing the mark operation on the mark button displayed in the human-computer interaction interface is obtained, or the operation instruction generated by performing the mark operation on the mark button displayed in the relationship establishment layer is obtained. Therefore, the operation instruction can be flexibly obtained, and then the operation instruction is parsed, thereby improving efficiency of obtaining the operation instruction.

Optionally, the generating the prompt identifier matching the object type includes: generating, in a case that the object type indicates an attack type, an attack identifier matching the attack type; generating, in a case that the object type indicates an attack assist type, an attack assist identifier matching the attack assist type; generating, in a case that the object type indicates a defense type, a defense identifier matching the defense type; and generating, in a case that the object type indicates a supply type, a supply identifier matching the supply type.

Figure 4:
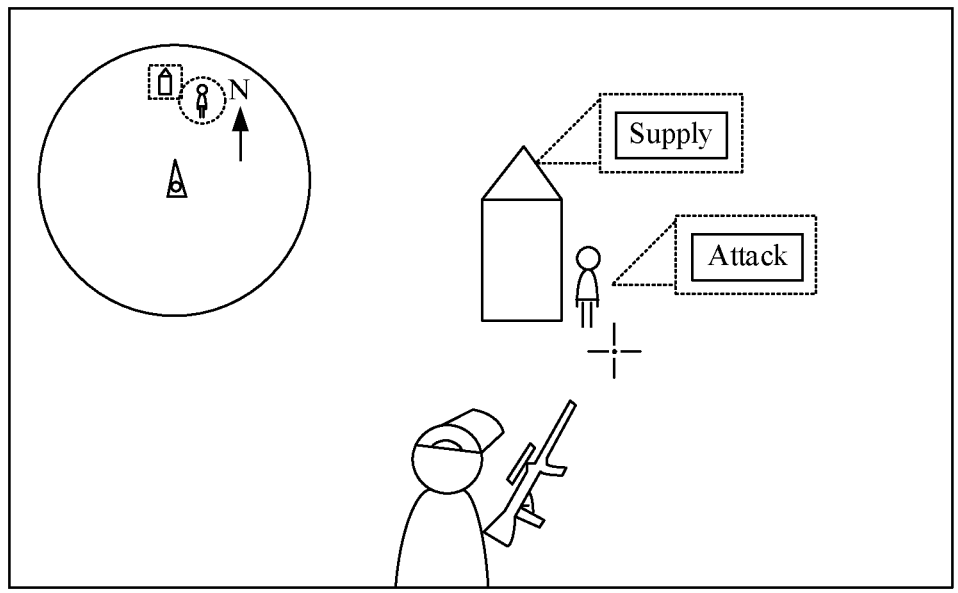
FIG. 4 is a schematic diagram of another exemplary information prompting method according to an embodiment of this application.

Optionally, descriptions are provided still with reference to the foregoing field of gaming. The attack identifier may be a circular identifier, the attack assist identifier may be a double-horizontal line identifier, the defense identifier may be a triangle identifier, and the supply identifier may be a square identifier. As shown in FIG. 4, if after the first user performs a mark operation on the house in the game, a corresponding type of the house is the supply type, the house surrounded by the square supply identifier is displayed in the minimap, indicating that there is a supply in the house or near the house. If after the first user performs a mark operation on a small-sized character in the game, a corresponding type of the person is an attack type, the small-sized character in the minimap is surrounded by the circular attack identifier, indicating that the small-sized character is to be attacked.

The attack identifier is generated when the object type is the attack type, the attack assist identifier is generated when the object type is the attack assist type, the defense identifier is generated when the object type is the defense type, and the supply identifier is generated when the object type is the supply type, thereby providing abundant choices for the prompt identifier, and further improving display flexibility of the prompt identifier.

Optionally, the displayed prompt identifier may be automatically cleared after a particular condition is met. The clear condition includes at least one of the following: a deletion instruction is obtained, the deletion instruction being used for instructing to delete the prompt identifier; it is determined that an association relationship is already established between the virtual object and the first virtual role; it is determined that an association relationship is already established between the virtual object and the second virtual role; distances between all virtual roles included in the faction to which the first virtual role belongs and the first position all exceed a first threshold; and a display duration of the prompt identifier reaches a second threshold.

For example, descriptions are provided still with reference to the foregoing field of gaming. The virtual object may be a medical kit. The deletion instruction may be an instruction entered by using a keyboard, or the deletion instruction is generated after that a deletion button is clicked by using a mouse is received. After the deletion instruction is received, the displayed prompt identifier is cleared. Alternatively, after a virtual role corresponding to an account that the first user logs in to and a virtual role corresponding to an account that the second user logs in to reach the first position identified by the prompt identifier and pick up the medical kit, the displayed prompt identifier is cleared. Alternatively, when distances between all virtual roles in the faction to which the first virtual role belongs and the medical kit all exceed the first threshold, the displayed prompt identifier is cleared.

In this embodiment, display flexibility of the prompt identifier can be improved by automatically clearing the prompt identifier. Further, the prompt identifier is cleared when the foregoing condition is met, thereby avoiding a problem that to-be-displayed content is blocked by excessive prompt identifiers, and improving display efficiency of the prompt identifier.

Optionally, the displaying the prompt identifier at the first position includes: displaying the prompt identifier in a map matching the virtual scene, the map including a panoramic map and a local map, the local map being used for indicating a map corresponding to a region in which the first virtual role is located.

Figure 5:
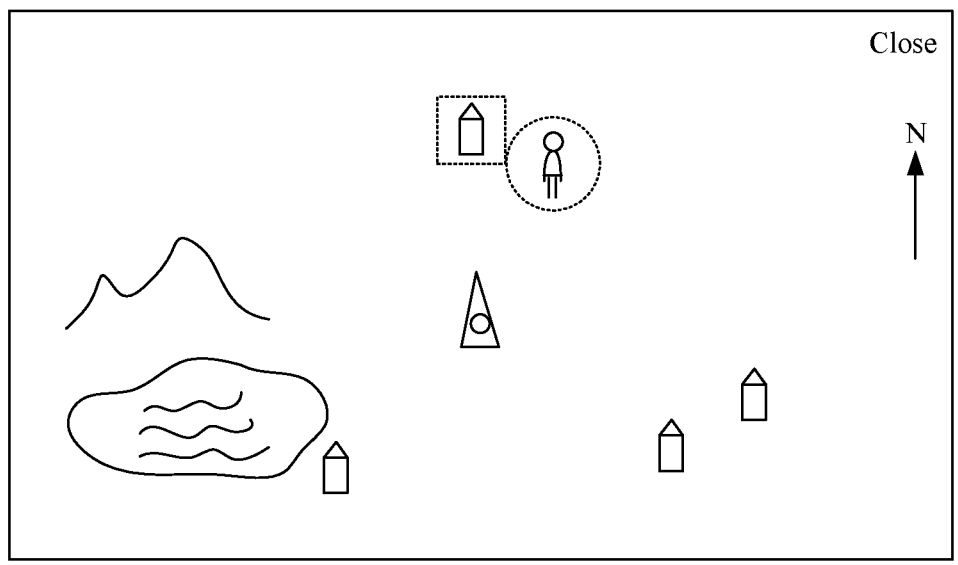
FIG. 5 is a schematic diagram of still another exemplary information prompting method according to an embodiment of this application.

For example, descriptions are provided still with reference to the foregoing field of gaming, FIG. 4, and FIG. 5. There is not only the local map but also the panoramic map in the game. The panoramic map may be displayed after an open instruction is received. FIG. 4 shows a case in which a local map is a minimap. The prompt identifier of the virtual object is displayed in the minimap. FIG. 5 shows a case of a panoramic map. In FIG. 5, the prompt identifier of the virtual object is displayed in the panoramic map.

In this embodiment, the prompt identifier is displayed in the panoramic map or the local map, thereby improving display flexibility of the prompt identifier.

Optionally, after the prompt identifier is displayed at the first position, or before the operation instruction is obtained, the method further includes: obtaining a moving track generated by performing a move operation in a human-computer interaction interface, the moving track being used for prompting an action track that the second virtual role is to refer to in a process of reaching the virtual object; and displaying the moving track in the human-computer interaction interface.

Optionally, the moving track may be a screen touch track generated by performing an operation on a touchscreen, or may be a peripheral moving track generated by dragging a peripheral (such as a mouse).

Figure 6:
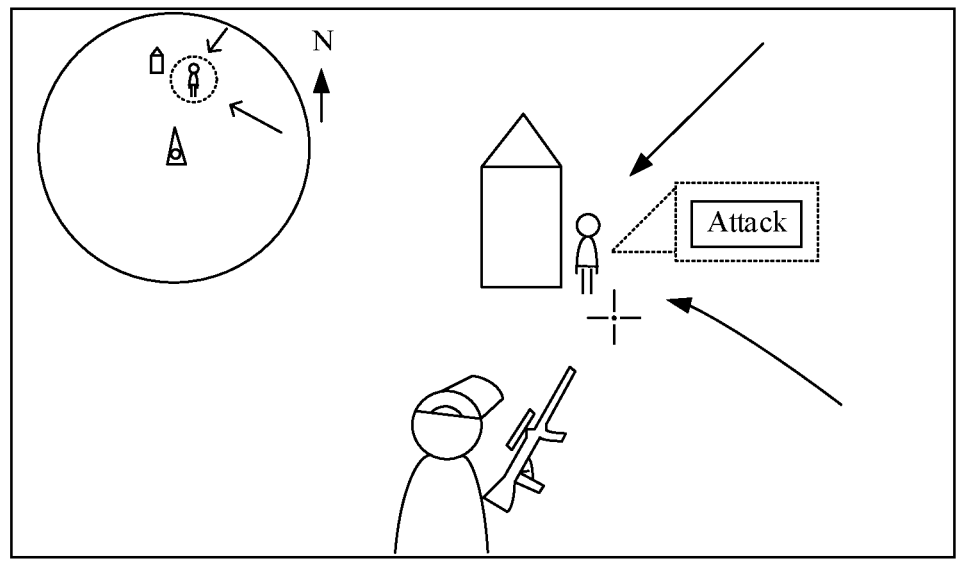
FIG. 6 is a schematic diagram of still another exemplary information prompting method according to an embodiment of this application.

For example, descriptions are provided still with reference to the field of gaming. As shown in FIG. 6, after the first user controlling the first virtual role performs a screen touch track operation in the human-computer interaction interface, the screen touch track indicates different attack directions, and then an action track of the small-sized character that attacks near the house in FIG. 6 is displayed in the minimap.

Optionally, after the screen touch track generated by performing the screen touch operation in the human-computer interaction interface is obtained, the method further includes: notifying the second virtual role of a track type of the screen touch track, the track type including at least one of the following: an attack track for indicating an attack, a retreat track for indicating a retreat, and a search track for indicating a search range.

Optionally, the notifying the second virtual role of a track type of the screen touch track may be displaying the track type in a virtual scene in which the second virtual role is located, or sending a notification to the second virtual role, and displaying the track type in the virtual scene in which the second virtual role is located after the second virtual role agrees.

Figure 7:
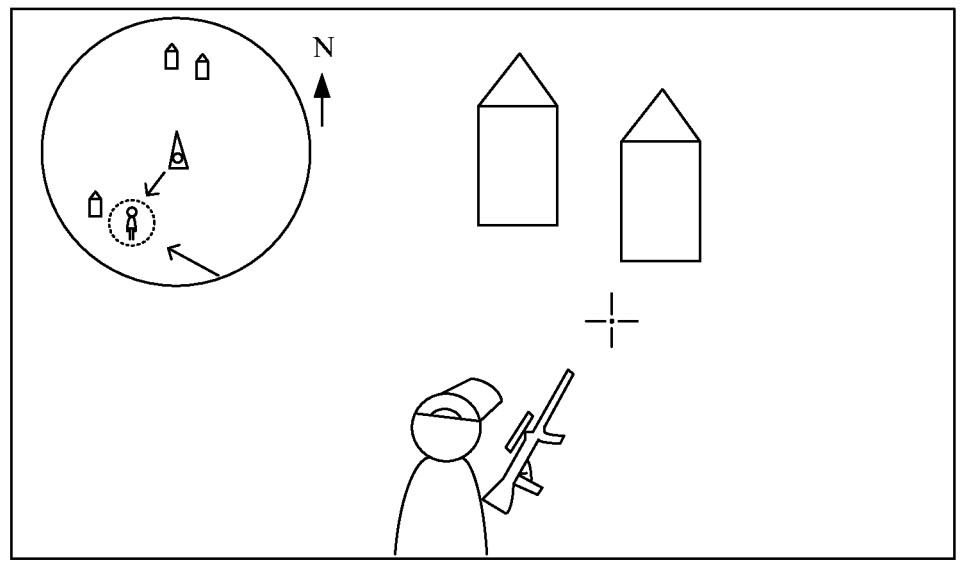
FIG. 7 is a schematic diagram of still another exemplary information prompting method according to an embodiment of this application.

For example, descriptions are provided still with reference to the foregoing field of gaming. As shown in FIG. 7, FIG. 7 is a schematic diagram of gaming of the second user controlling the second virtual role. In a minimap of the second virtual role, the track type sent by the first virtual role is displayed, and the track type is an attack track. The attack track indicates an attack route for attacking the virtual object in the minimap.

Optionally, the attack track, retreat track, and search track may be represented by using any one or a combination of an image, an animation, and the like.

For example, the attack track may be an arrow that flashes in red, the retreat track may be an arrow that flashes in yellow, and the search track may be a white circle. FIG. 7 is a schematic effect diagram after grayscale conversion. In an actual application, the color of the arrow representing the track may be a color matching the track type. For example, when the track is an attack track, the track may be an arrow that flashes in red.

In this embodiment, the screen touch track generated by performing the screen touch operation in the human-computer interaction interface is obtained, and the screen touch track is displayed in the human-computer interaction interface, thereby improving flexibility of displayed content and enriching the displayed content.

Optionally, after a moving track generated by performing a move operation in the human-computer interaction interface is obtained, the method further includes: obtaining a clear instruction generated by performing a clear operation on a clear button displayed in the human-computer interaction interface; and clearing, according to the clear instruction, the moving track currently displayed in the human-computer interaction interface.

For example, descriptions are provided still with reference to the foregoing field of gaming. After the screen touch track is displayed, the attack route already displayed in the minimap is cleared after a clear instruction is received.

Optionally, before a moving track generated by performing a move operation in the human-computer interaction interface is obtained, the method further includes: determining, from the second virtual roles, a target account on which the moving track is to be displayed, displaying the moving track in a human-computer interaction interface corresponding to the target account, and hiding the moving track in a human-computer interaction interface corresponding to an account other than the target account in the second virtual roles.

Optionally, the determining, from the second virtual roles, a target account on which the moving track is to be displayed includes: using the second virtual role belonging to the same faction or team as the first virtual role as the target account, or using the second virtual role specified by the first virtual role as the target account.

For example, descriptions are provided still with reference to the foregoing field of gaming. The screen touch track specified by the first virtual role is displayed in a display interface of a second virtual role belonging to the same team as the first virtual role, and the screen touch track is hidden to a second virtual role not belonging to the same team as the first virtual role.

Optionally, the displaying the moving track in the human-computer interaction interface includes: displaying the moving track in a map matching the virtual scene, the map including a panoramic map and a local map, the local map being used for indicating a map corresponding to a region in which the first virtual role is located.

For example, descriptions are provided still with reference to the foregoing field of gaming, FIG. 7, and FIG. 8. As shown in FIG. 7, FIG. 7 shows a case in which the screen touch track is displayed in the minimap of the second virtual role. The attack route is displayed in FIG. 7. As shown in FIG. 8, FIG. 8 shows a case in which the screen touch track sent by the first virtual role is displayed in a panoramic map of the second virtual role. The screen touch track indicates the attack route.

In this embodiment, an operation instruction is obtained in a virtual scene in which a first virtual role is located; a prompt identifier matching the virtual object is generated according to the operation instruction; and the prompt identifier is displayed at the first position. The virtual object is used for assisting the first virtual role to complete a task specified in the virtual scene. The prompt identifier is used for prompting attribute information of the virtual object to a second virtual role belonging to the same faction as the first virtual role. In the foregoing method, after the operation instruction is obtained, the prompt identifier matching the virtual object is generated according to the operation instruction. Therefore, the generated prompt identifier changes according to different operation instructions, thereby enriching the prompt identifier displayed in a map.

According to another aspect of the embodiments of this application, an information prompting method is further provided. Optionally, as shown in FIG. 9, the information prompting method include the following steps.

In step S902, in a virtual scene displayed in a human-computer interaction interface corresponding to a first virtual role, a moving track generated by performing a move operation in the human-computer interaction interface is obtained, the moving track being used for prompting an action track that a virtual role in a faction or team to which the first virtual role belongs is to refer to. For example, the moving track is used to notify a virtual role of an action track that the virtual role in a team of the first virtual role is to refer to during task execution.

In step S904, the moving track is displayed in the human-computer interaction interface.

Optionally, the information prompting method may be applied to, but is not limited to, the field of gaming, the field of simulation training, the field of navigation, or the field of map graffiti.

Optionally, the moving track may be a screen touch track generated by performing an operation on a touchscreen, or may be a peripheral moving track generated by dragging a peripheral (such as a mouse).

Figure 10:
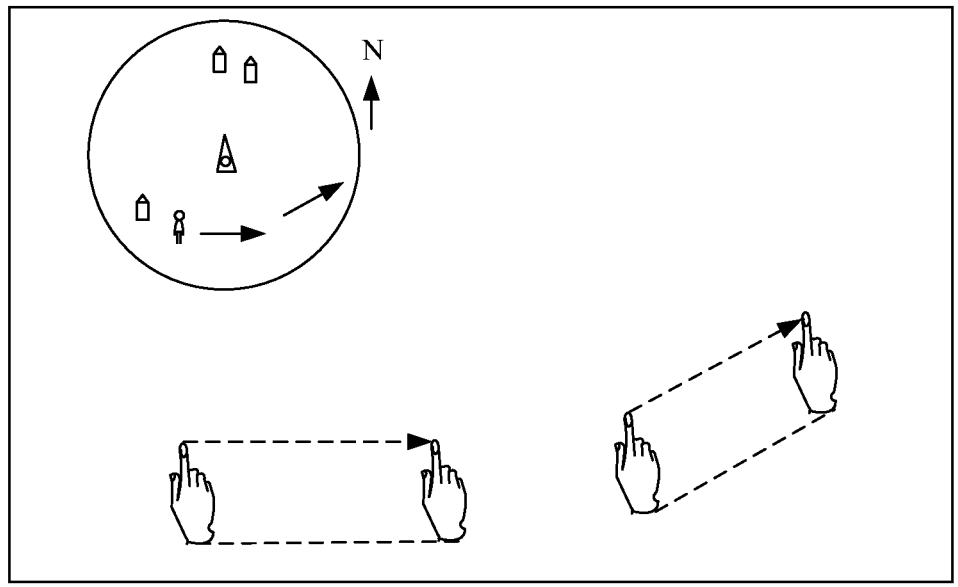
FIG. 10 is a schematic diagram of still another exemplary information prompting method according to an embodiment of this application.

Descriptions are provided below with reference to the field of map graffiti. As shown in FIG. 10, after a screen touch track generated by performing an operation on a touchscreen is obtained, a moving track matching the screen touch track is displayed in a map according to the screen touch track.

Figure 11:
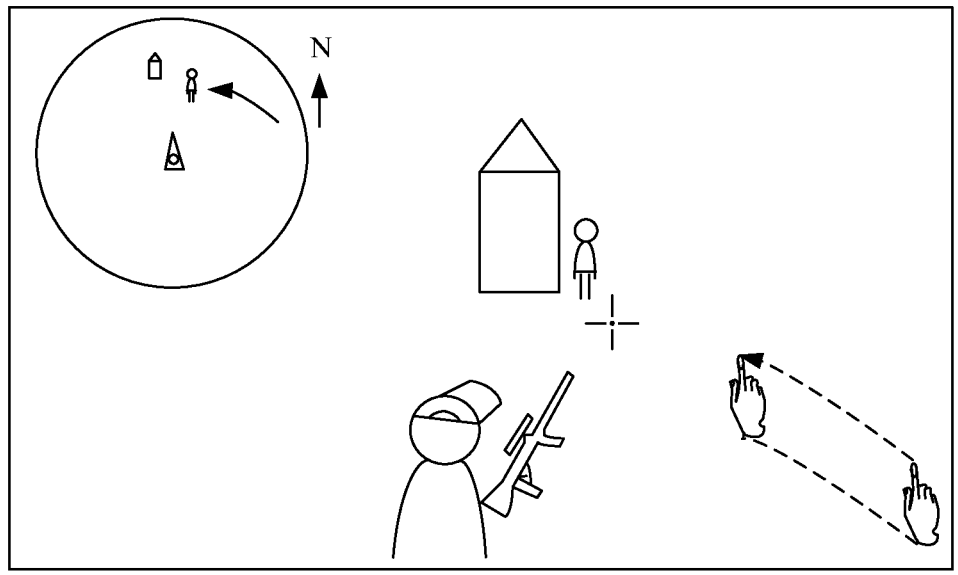
FIG. 11 is a schematic diagram of still another exemplary information prompting method according to an embodiment of this application.

Descriptions are provided below by using the field of gaming as an example. The virtual scene is a game scene, and the virtual role may be a virtual role controlled by a user. During the game, in a process in which a first user controls a virtual role in the game to play, after receiving a move operation, a client generates a moving track according to the move operation, the moving track being used for indicating an action track to which all virtual roles refer during the game. As shown in FIG. 11, after a screen touch track generated by performing an operation on a touchscreen is obtained, a moving track matching the screen touch track is displayed in a map of the game according to the screen touch track.

Descriptions are provided below by using the field of simulation training as an example. The virtual role may be a virtual role used by a user during training. The virtual scene may be a training scene. The user may control the virtual role to train in the training scene. When the user is in the training process, after obtaining a move operation, the client generates a moving track according to the move operation, the moving track being used for prompting a virtual role participating in the training and belonging to the same faction as the virtual role controlled by the user to move by referring to an action track prompted by the moving track.

In the related art, when a destination identifier is displayed in a map, usually, only a destination identifier for prompting a destination location is displayed to other virtual roles. Because only the destination identifier is displayed, displayed information is relatively monotonous. However, in this embodiment, after the moving track generated by performing the move operation in the human-computer interaction interface is obtained, the moving track is displayed in the human-computer interaction interface, so that the action track can be displayed according to the moving track, thereby enriching displayed content.

Optionally, after the moving track is obtained, the method further includes: notifying a second virtual role belonging to the same faction as the first virtual role of a track type of the moving track, the track type including at least one of the following: an attack track for indicating an attack, a retreat track for indicating a retreat, and a search track for indicating a search range.

In this embodiment, the moving track sent by the virtual object is displayed according to the track type, so that display accuracy of the moving track can be improved, and displayed content is enriched.

Optionally, descriptions are provided still with reference to the foregoing game process. In a process of playing the game, there are different factions. Virtual roles belonging to the same faction can share a moving track with each other. For example, a moving track on a client of a first user can be shared to a client of a second user. A virtual role controlled by the first user and a virtual role controlled by the second user belong to the same faction.

Optionally, the moving track may be cleared in a particular condition. After a clear instruction generated by performing a clear operation on a clear button displayed in the human-computer interaction interface is obtained, the moving track displayed in the human-computer interaction interface is cleared according to the clear instruction.

Figure 12:
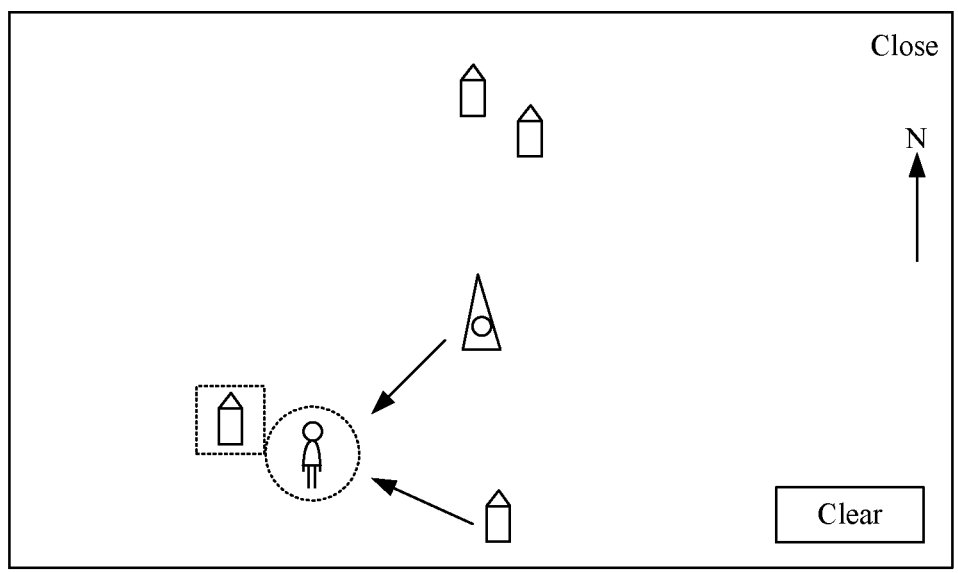
FIG. 12 is a schematic diagram of still another exemplary information prompting method according to an embodiment of this application.

For example, as shown in FIG. 12, a clear button is displayed in a display interface of a terminal and is used for clearing a moving track displayed in the display interface of the terminal. After the clear button is pressed, the moving track in FIG. 12 is cleared.

Optionally, when the moving track is cleared, the moving tracks may be cleared one by one according to the clear instruction, or all the moving tracks may be cleared once according to the clear instruction, or the moving tracks may be selectively cleared according to a clear condition carried in the clear instruction.

For example, the clear condition is to clear moving tracks ten minutes before, clear moving tracks of a specific type, for example, moving tracks of the attack type, clear moving tracks of a specific virtual role, or to clear moving tracks within a range.

In this embodiment, the moving track is cleared according to the clear instruction, thereby avoiding a problem that to-be-displayed content is blocked by excessive moving tracks, and improving display efficiency of the prompt identifier.

Optionally, the moving track may be shared in the following method: determining a third virtual role from all virtual roles included in the faction to which the first virtual role belongs, displaying the moving track in a human-computer interaction interface corresponding to the third virtual role, and hiding the moving track in a human-computer interaction interface corresponding to a virtual role other than the third virtual role in all virtual roles included in the faction to which the first virtual role belongs.

For example, descriptions are provided still with reference to the foregoing field of gaming. The moving track specified by the first virtual role is displayed in a display interface of a second virtual role belonging to the same team as the first virtual role, and the moving track is hidden to a second virtual role not belonging to the same team as the first virtual role. Alternatively, a third virtual role is determined from the second virtual roles belonging to the same team as the first virtual role, then the moving track is displayed in a display interface of the determined third virtual role, and the moving track is hidden in a display interface of another virtual role.

In this embodiment, the third virtual role is determined, and the moving track is displayed in the human-computer interaction interface corresponding to the target account, so that the moving track is selectively displayed in the display interface of the virtual role belonging to the same faction as the first virtual role, thereby improving display flexibility of the moving track.

Optionally, the third virtual role may be determined according to an instruction of the user, or may be determined according to a condition. The condition may be that a distance to the first virtual role is within a preset threshold, a state of the virtual role is a special state, the virtual role is executing a special task, or the like. The special state may be that a blood volume is higher than a second threshold, or the blood volume is lower than a third threshold.

For example, descriptions are provided still with reference to the foregoing game process. A virtual role whose bleeding volume is higher than a preset threshold is determined as the third virtual role from other virtual roles belonging to the same faction as the first virtual role. After the moving track is obtained, the moving track is sent to the third virtual role, and the moving track is displayed in a display interface of a client corresponding to the third virtual role, so that the third virtual role moves according to the moving track.

Optionally, the displaying the moving track in the human-computer interaction interface includes: displaying the moving track in a map matching the virtual scene, the map including a panoramic map and a local map, the local map being used for indicating a map corresponding to a region in which the first virtual role is located. By displaying the moving track in the panoramic map or the local map of the target account, display flexibility of the moving track can be improved.

In this embodiment, the moving track generated by performing a move operation in the human-computer interaction interface is obtained, the moving track being used for prompting the action track that all virtual roles included in the faction to which the first virtual role belongs are to refer to in a process of completing a task specified in the virtual scene, and then the moving track is displayed in the human-computer interaction interface, so that to-be-displayed content in the human-computer interaction interface can be determined according to the obtained moving track, thereby improving flexibility of the content displayed in the display interface.

Figure 13:
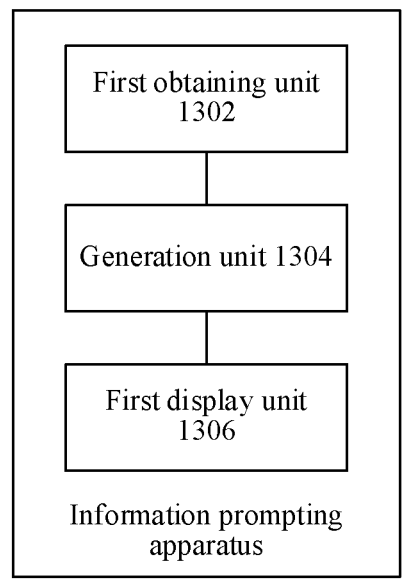
FIG. 13 is a schematic structural diagram of an exemplary information prompting apparatus according to an embodiment of this application.

According to still another aspect of the embodiments of this application, an information prompting apparatus configured to implement the foregoing information prompting method is further provided. As shown in FIG. 13, the apparatus includes a first obtaining unit 1302, a generation unit 1304, and a first display unit 1306. One or more of the units can be implemented by processing circuitry.

The first obtaining unit 1302 is configured to obtain an operation instruction in a virtual scene in which a first virtual role is located, the operation instruction being generated by performing, by the first virtual role, a mark operation on a virtual object at a first position, the virtual object being used for assisting the first virtual role to complete a task specified in the virtual scene.

The generation unit 1304 is configured to generate, according to the operation instruction, a prompt identifier matching the virtual object, the prompt identifier being used for prompting attribute information of the virtual object to a second virtual role belonging to the same faction as the first virtual role.

The first display unit 1306 is configured to display the prompt identifier at the first position.

In an optional implementation solution, the generation unit 1304 includes a parsing module and a generation module.

The parsing module is configured to parse the operation instruction, to determine an object type of the virtual object.

The generation module is configured to generate the prompt identifier matching the object type, the prompt identifier including an attribute icon corresponding to the virtual object.

In this embodiment, the object type of the virtual object is determined by parsing the operation instruction, so that the prompt identifier matching the object type of the virtual object can be displayed, thereby improving display flexibility of the prompt identifier and enriching content of the prompt identifier.

In an optional implementation solution, the generation module includes a first generation submodule, a second generation submodule, a third generation submodule, and a fourth generation submodule.

The first generation submodule is configured to generate, in a case that the object type indicates an attack type, an attack identifier matching the attack type.

The second generation submodule is configured to generate, in a case that the object type indicates an attack assist type, an attack assist identifier matching the attack assist type.

The third generation submodule is configured to generate, in a case that the object type indicates a defense type, a defense identifier matching the defense type.

The fourth generation submodule is configured to generate, in a case that the object type indicates a supply type, a supply identifier matching the supply type.

In this embodiment, the attack identifier is generated when the object type is the attack type, the attack assist identifier is generated when the object type is the attack assist type, the defense identifier is generated when the object type is the defense type, and the supply identifier is generated when the object type is the supply type, thereby providing abundant choices for the prompt identifier, and further improving display flexibility of the prompt identifier.

In an optional implementation solution, the apparatus further includes a clearing unit that is configured to automatically clear, after the prompt identifier is displayed at the first position, the prompt identifier displayed at the first position in a case that a clear condition is met.

Optionally, the automatically clearing the prompt identifier may be clearing, in a case that the clear condition is met, prompt identifiers meeting the clear condition one by one, or clearing all prompt identifiers meeting the clear condition.

In this embodiment, display flexibility of the prompt identifier can be improved by automatically clearing the prompt identifier.

In an optional implementation solution, the apparatus further includes at least one of a first determining unit, a second determining unit, a third determining unit, a fourth determining unit, and a fifth determining unit.

The first determining unit is configured to determine, before the prompt identifier displayed at the first position is automatically cleared, that the clear condition is met in a case that a deletion instruction is obtained, the deletion instruction being used for instructing to delete the prompt identifier.

The second determining unit is configured to determine, before the prompt identifier displayed at the first position is automatically cleared, that the clear condition is met in a case that it is determined that an association relationship is already established between the virtual object and the first virtual role.

The third determining unit is configured to determine, before the prompt identifier displayed at the first position is automatically cleared, that the clear condition is met in a case that it is determined that an association relationship is already established between the virtual object and the second virtual role.

The fourth determining unit is configured to determine that the clear condition is met in a case that distances between all virtual roles included in the faction to which the first virtual role belongs and the first position all exceed a first threshold.

The fifth determining unit is configured to determine, before the prompt identifier displayed at the first position is automatically cleared, that the clear condition is met in a case that a display duration of the prompt identifier reaches a second threshold.

In this embodiment, the prompt identifier is cleared when the foregoing condition is met, thereby avoiding a problem that to-be-displayed content is blocked by excessive prompt identifiers, and improving display efficiency of the prompt identifier.

In an optional implementation solution, the first obtaining unit 1302 includes at least one of a first obtaining module and a second obtaining module.

The first obtaining module is configured to obtain the operation instruction generated by performing a mark operation on a mark button displayed in a human-computer interaction interface.

The second obtaining module is configured to obtain a click instruction generated by performing a click operation on the virtual object; display a relationship establishment layer in response to the click instruction, the relationship establishment layer being used for instructing to establish an association relationship between the virtual object and the first virtual role; and obtain the operation instruction generated by performing a mark operation on a mark button displayed in the relationship establishment layer.

In this embodiment, the operation instruction generated by performing the mark operation on the mark button displayed in the human-computer interaction interface is obtained, or the operation instruction generated by performing the mark operation on the mark button displayed in the relationship establishment layer is obtained. Therefore, the operation instruction can be flexibly obtained, and then the operation instruction is parsed, thereby improving efficiency of obtaining the operation instruction.

In an optional implementation solution, the first display unit 1306 includes a first display module, configured to display the prompt identifier in a map matching the virtual scene, the map including a panoramic map and a local map, the local map being used for indicating a map corresponding to a region in which the first virtual role is located.

In this embodiment, the prompt identifier is displayed in the panoramic map or the local map, thereby improving display flexibility of the prompt identifier.

In an optional implementation solution, the apparatus further includes a second obtaining unit and a second display unit.

The second obtaining unit is configured to obtain, after the prompt identifier at the first position is displayed, or before the operation instruction generated by performing the mark operation on the virtual object located at the first position is obtained, a moving track generated by performing a move operation in a human-computer interaction interface, the moving track being used for prompting an action track that the second virtual role is to refer to in a process of reaching the virtual object.

The second display unit is configured to display the moving track in the human-computer interaction interface.

In this embodiment, the screen touch track generated by performing the screen touch operation in the human-computer interaction interface is obtained, and the screen touch track is displayed in the human-computer interaction interface, thereby improving flexibility of displayed content and enriching the displayed content.

Figure 14:
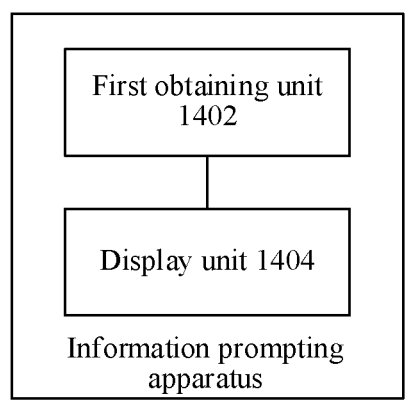
FIG. 14 is a schematic structural diagram of another exemplary information prompting apparatus according to an embodiment of this application.

According to still another aspect of the embodiments of this application, an information prompting apparatus is further provided. Optionally, as shown in FIG. 14, the information prompting apparatus includes a first obtaining unit 1402 and a display unit 1404.

The first obtaining unit 1402 is configured to obtain, in a virtual scene displayed in a human-computer interaction interface corresponding to a first virtual role, a moving track generated by performing a move operation in the human-computer interaction interface, the moving track being used for prompting an action track that a virtual role in a faction to which the first virtual role belongs is to refer to during task execution.

The display unit 1404 is configured to display the moving track in the human-computer interaction interface.

In an optional implementation solution, the apparatus further includes a notification unit that is configured to notify, after the moving track generated by performing the move operation in the human-computer interaction interface is obtained, a second virtual role belonging to the same faction as the first virtual role of a track type of the moving track, the track type including at least one of the following: an attack track for indicating an attack, a retreat track for indicating a retreat, and a search track for indicating a search range.

In this embodiment, the moving track sent by the virtual object is displayed according to the track type, so that display accuracy of the moving track can be improved, and displayed content is enriched.

In an optional implementation solution, the apparatus further includes a second obtaining unit and a clearing unit.

The second obtaining unit is configured to obtain, after the moving track generated by performing the move operation in the human-computer interaction interface is obtained, a clear instruction generated by performing a clear operation on a clear button displayed in the human-computer interaction interface.

The clearing unit is configured to clear, according to the clear instruction, the moving track currently displayed in the human-computer interaction interface.

In this embodiment, the moving track is cleared according to the clear instruction, thereby avoiding a problem that to-be-displayed content is blocked by excessive moving tracks, and improving display efficiency of the prompt identifier.

In an optional implementation solution, the apparatus further includes a determining unit that is configured to determine, before the moving track generated by performing the move operation in the human-computer interaction interface is obtained, a third virtual role from all virtual roles included in the faction to which the first virtual role belongs, displaying the moving track in a human-computer interaction interface corresponding to the third virtual role, and hiding the moving track in a human-computer interaction interface corresponding to a virtual role other than the third virtual role in all virtual roles included in the faction to which the first virtual role belongs.

In this embodiment, the third virtual role is determined, and the moving track is displayed in the human-computer interaction interface corresponding to the target account, so that the moving track is selectively displayed in the display interface of the virtual role belonging to the same faction as the first virtual role, thereby improving display flexibility of the moving track.

In an optional implementation solution, the display unit includes a display module that is configured to display the moving track in a map matching the virtual scene, the map including a panoramic map and a local map, the local map being used for indicating a map corresponding to a region in which the first virtual role is located.

In this embodiment, by displaying the moving track in the panoramic map or the local map of the target account, display flexibility of the moving track can be improved.

Figure 15:
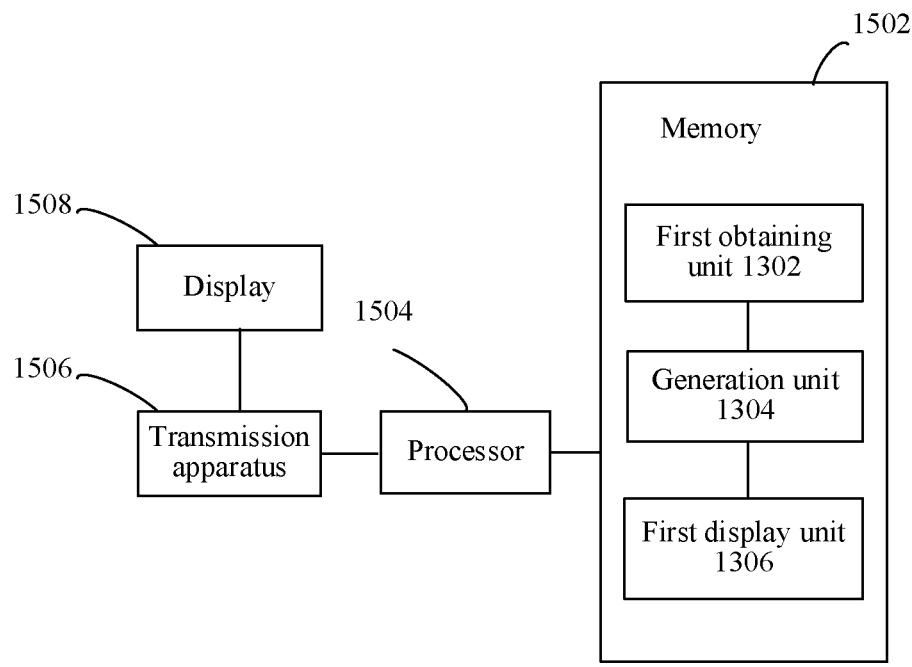
FIG. 15 is a schematic structural diagram of an exemplary electronic device according to an embodiment of this application.

According to still another aspect of the embodiments of this application, an electronic device configured to implement the foregoing information prompting method is further provided. As shown in FIG. 15, the electronic device includes a memory and a processor, the memory storing a computer program, and the processor being configured to perform the steps in any one of the foregoing method embodiments by using the computer program.

Optionally, in this embodiment, the electronic device may be located in at least one of a plurality of network devices in a computer network.

Optionally, in this embodiment, the processor may be configured to perform the following steps by using the computer program: (i) obtaining an operation instruction in a virtual scene in which a first virtual role is located, the operation instruction being generated by performing a mark operation on a virtual object at a first position, the virtual object being used for assisting the first virtual role to complete a task specified in the virtual scene; (ii) generating, according to the operation instruction, a prompt identifier matching the virtual object, the prompt identifier being used for prompting attribute information of the virtual object to a second virtual role belonging to the same faction as the first virtual role; and (iii) displaying the prompt identifier at the first position.

Optionally, a person of ordinary skill in the art may understand that the structure shown in FIG. 15 is merely an exemplary schematic. The electronic device may be a terminal device such as a smartphone (e.g., an Android mobile phone or an iOS mobile phone), a tablet computer, a palmtop computer, a mobile Internet device (MID), or a PAD. FIG. 15 does not limit the structure of the foregoing electronic device. For example, the electronic device may further include more or fewer components (such as a network interface) than those shown in FIG. 15, or have a configuration different from that shown in FIG. 15.

The memory 1502 may be configured to store a software program and a module, for example, a program instruction/module corresponding to the information prompting method and apparatus in the embodiments of this application, and the processor 1504 performs various functional applications and data processing by running a software program and a module stored in the memory 1502, that is, implementing the foregoing information prompting method. The memory 1502 may include a high-speed random memory, and may further include a non-volatile memory such as one or more magnetic storage apparatuses, a flash, or another non-volatile solid-state memory. In some examples, the memory 1502 may further include memories remotely disposed relative to the processor 1504, and the remote memories may be connected to a terminal through a network. Examples of the network include, but are not limited to, the Internet, an intranet, a local area network, a mobile communications network, and a combination thereof.

The transmission apparatus 1506 is configured to receive or send data through a network. Specific examples of the foregoing network may include a wired network and a wireless network. In an example, the transmission apparatus 1506 includes a network interface controller (NIC). The NIC may be connected to another network device and a router by using a network cable, so as to communicate with the Internet or a local area network. In an example, the transmission apparatus 1506 is a radio frequency (RF) module, which communicates with the Internet in a wireless manner.

Specifically, the memory 1502 is configured to store content such as a prompt identifier and an operation instruction.

Figure 16:
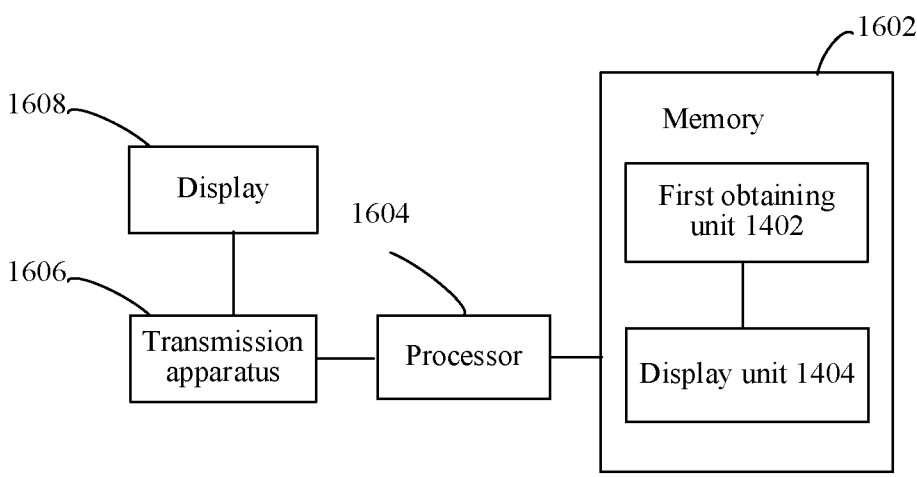
FIG. 16 is a schematic structural diagram of another exemplary electronic device according to an embodiment of this application.

According to still another aspect of the embodiments of this application, an electronic device configured to implement the foregoing information prompting method is further provided. As shown in FIG. 16, the electronic device includes a memory and a processor, the memory storing a computer program, and the processor being configured to perform the steps in any one of the foregoing method embodiments by using the computer program.

Optionally, in this embodiment, the electronic device may be located in at least one of a plurality of network devices in a computer network.

Optionally, in this embodiment, the processor may be configured to perform the following steps by using the computer program: (i) obtain, in a virtual scene displayed in a human-computer interaction interface corresponding to a first virtual role, a moving track generated by performing a move operation in the human-computer interaction interface, the moving track being used for prompting an action track that a virtual role in a faction to which the first virtual role belongs is to refer to during task execution; and (ii) display the moving track in the human-computer interaction interface.

Optionally, a person of ordinary skill in the art may understand that the structure shown in FIG. 16 is merely an exemplary schematic. The electronic device may be a terminal device such as a smartphone (e.g., an Android mobile phone or an iOS mobile phone), a tablet computer, a palmtop computer, a MID, or a PAD. FIG. 16 does not limit the structure of the foregoing electronic device. For example, the electronic device may further include more or fewer components (e.g., a network interface) than those shown in FIG. 16, or have a configuration different from that shown in FIG. 16.

The memory 1602 may be configured to store a software program and a module, for example, a program instruction/module corresponding to the information prompting method and apparatus in the embodiments of this application, and the processor 1604 performs various functional applications and data processing by running a software program and a module stored in the memory 1602, that is, implementing the foregoing information prompting method. The memory 1602 may include a high-speed random memory, and may further include a non-volatile memory such as one or more magnetic storage apparatuses, a flash, or another non-volatile solid-state memory. In some examples, the memory 1602 may further include memories remotely disposed relative to the processor 1604, and the remote memories may be connected to a terminal through a network. Examples of the network include, but are not limited to, the Internet, an intranet, a local area network, a mobile communications network, and a combination thereof.

The transmission apparatus 1606 is configured to receive or send data through a network. Specific examples of the foregoing network may include a wired network and a wireless network. In an example, the transmission apparatus 1606 includes a NIC. The NIC may be connected to another network device and a router by using a network cable, so as to communicate with the Internet or a local area network. In an example, the transmission apparatus 1606 is an RF module, which communicates with the Internet in a wireless manner.

Specifically, the memory 1602 is configured to store content such as a prompt identifier and an operation instruction.

According to still another aspect of the embodiments of this application, a storage medium (e.g., a non-transitory computer-readable storage medium) is further provided. The storage medium stores a computer program, the computer program being configured to perform, when being run, the steps in any one of the foregoing method embodiments.

Optionally, in this embodiment, the storage medium may be configured to store a computer program for performing the following steps: (i) obtaining an operation instruction in a virtual scene in which a first virtual role is located, the operation instruction being generated by performing a mark operation on a virtual object at a first position, the virtual object being used for assisting the first virtual role to complete a task specified in the virtual scene; (ii) generating, according to the operation instruction, a prompt identifier matching the virtual object, the prompt identifier being used for prompting attribute information of the virtual object to a second virtual role belonging to the same faction as the first virtual role; and (iii) displaying the prompt identifier at the first position.

Optionally, in this embodiment, the storage medium may be configured to store a computer program for performing the following steps: (i) parsing the operation instruction, to determine an object type of the virtual object; and (ii) generating the prompt identifier matching the object type, the prompt identifier including an attribute icon corresponding to the virtual object.

Optionally, in this embodiment, the storage medium may be configured to store a computer program for performing the following steps: (i) generating, in a case that the object type indicates an attack type, an attack identifier matching the attack type; (ii) generating, in a case that the object type indicates an attack assist type, an attack assist identifier matching the attack assist type; (iii) generating, in a case that the object type indicates a defense type, a defense identifier matching the defense type; and (iv) generating, in a case that the object type indicates a supply type, a supply identifier matching the supply type.

Optionally, in this embodiment, the storage medium may be configured to store a computer program for performing the following step of automatically clearing the prompt identifier displayed at the first position in a case that a clear condition is met.

Optionally, in this embodiment, the storage medium may be configured to store a computer program for performing the following steps: (i) determining that the clear condition is met in a case that a deletion instruction is obtained, the deletion instruction being used for instructing to delete the prompt identifier; (ii) determining that the clear condition is met in a case that it is determined that an association relationship is already established between the virtual object and the first virtual role; (iii) determining that the clear condition is met in a case that it is determined that an association relationship is already established between the virtual object and the second virtual role; (iv) determining that the clear condition is met in a case that distances between all virtual roles included in the faction to which the first virtual role belongs and the first position all exceed a first threshold; and (v) determining that the clear condition is met in a case that a display duration of the prompt identifier reaches a second threshold.

Optionally, in this embodiment, the storage medium may be configured to store a computer program for performing the following steps: (i) obtaining the operation instruction generated by performing a mark operation on a mark button displayed in a human-computer interaction interface; and (ii) obtaining a click instruction generated by performing a click operation on the virtual object; displaying a relationship establishment layer in response to the click instruction, the relationship establishment layer being used for instructing to establish an association relationship between the virtual object and the first virtual role; and obtaining the operation instruction generated by performing a mark operation on a mark button displayed in the relationship establishment layer.

Optionally, in this embodiment, the storage medium may be configured to store a computer program for performing the following step of displaying the prompt identifier in a map matching the virtual scene, the map including a panoramic map and a local map, the local map being used for indicating a map corresponding to a region in which the first virtual role is located.

Optionally, in this embodiment, the storage medium may be configured to store a computer program for performing the following steps: (i) obtaining a moving track generated by performing a move operation in a human-computer interaction interface, the moving track being used for prompting an action track that the second virtual role is to refer to in a process of reaching the virtual object; and (ii) displaying the moving track in the human-computer interaction interface.

Optionally, in this embodiment, a person of ordinary skill in the art may understand that all or some of the steps in the methods of the foregoing embodiments may be implemented by a program instructing relevant hardware of the terminal device. The program may be stored in a computer-readable storage medium (e.g., a non-transitory computer-readable storage medium). The storage medium may include a flash disk, a read-only memory (ROM), a random access memory (RAM), a magnetic disk, or an optical disc.

According to still another aspect of the embodiments of this application, a storage medium is further provided. The storage medium stores a computer program, the computer program being configured to perform, when being run, the steps in any one of the foregoing method embodiments.

Optionally, in this embodiment, the storage medium may be configured to store a computer program for performing the following steps: (i) obtaining, in a virtual scene displayed in a human-computer interaction interface corresponding to a first virtual role, a moving track generated by performing a move operation in the human-computer interaction interface, the moving track being used for prompting an action track that a virtual role in a faction to which the first virtual role belongs is to refer to during task execution; and (ii) displaying the moving track in the human-computer interaction interface.

Optionally, in this embodiment, the storage medium may be configured to store a computer program for performing the following step of notifying a second virtual role belonging to the same faction as the first virtual role of a track type of the moving track, the track type including at least one of the following: an attack track for indicating an attack, a retreat track for indicating a retreat, and a search track for indicating a search range.

Optionally, in this embodiment, the storage medium may be configured to store a computer program for performing the following steps: (i) obtaining a clear instruction generated by performing a clear operation on a clear button displayed in the human-computer interaction interface; and (ii) clearing, according to the clear instruction, the moving track currently displayed in the human-computer interaction interface.

Optionally, in this embodiment, the storage medium may be configured to store a computer program for performing the following steps of determining a third virtual role from all virtual roles included in the faction to which the first virtual role belongs, displaying the moving track in a human-computer interaction interface corresponding to the third virtual role, and hiding the moving track in a human-computer interaction interface corresponding to a virtual role other than the third virtual role in all virtual roles included in the faction to which the first virtual role belongs.

Optionally, in this embodiment, the storage medium may be configured to store a computer program for performing the following step of displaying the moving track in a map matching the virtual scene, the map including a panoramic map and a local map, the local map being used for indicating a map corresponding to a region in which the first virtual role is located.

According to still another aspect of the embodiments of this application, a computer program product including an instruction is further provided, the computer program product, when being run on a computer, causing the computer to perform the information prompting method.

Optionally, in this embodiment, a person of ordinary skill in the art may understand that all or some of the steps in the methods of the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, or an optical disc.

The sequence numbers of the embodiments of this application are merely for description purpose but do not indicate the preference of the embodiments.

When the integrated unit in the foregoing embodiments is implemented in a form of a software functional unit and sold or used as an independent product, the integrated unit may be stored in the foregoing computer-readable storage medium. Based on such understanding, the technical solutions of this application essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in this application, it is to be understood that the disclosed client may be implemented in other manners. The apparatus embodiments described above are merely exemplary. For example, the division of the units is merely the division of logic functions, and there may be another division manner during actual implementation. For example, a plurality of units or components may be combined, or may be integrated into another system, or some features may be omitted or not performed. In addition, the displayed or discussed mutual couplings or direct couplings or communication connections may be implemented by using some interfaces. The indirect couplings or communication connections between the units or modules may be implemented in electrical or other forms.

The units described as separate parts may or may not be physically separate, and the parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in the form of hardware (e.g., processing circuitry), or may be implemented in the form of a software functional unit.

The foregoing descriptions are merely exemplary implementations of this application, and a person of ordinary skill in the art may further make improvements and modifications without departing from the principle of this application. The improvements and modifications shall also fall within the protection scope of this application.

What is claimed is:

1. An information prompting method of a game application, the method comprising:

obtaining an operation instruction in a virtual scene of the game application in which a first virtual role is located, the operation instruction being generated in response to a marking operation, by a user of the first virtual role, on a virtual object at a first position, the virtual object being used by the first virtual role to complete a task in the virtual scene;

generating, by processing circuitry and based on the operation instruction, a preset prompt identifier according to (i) an object type of the virtual object on which the marking operation is performed and (ii) a user selection of one of a plurality of mark options displayed in a relationship establishment interface, the preset prompt identifier being displayed to a second virtual role belonging to a same team as the first virtual role; and displaying, by processing circuitry, the preset prompt identifier at the first position.

2. The information prompting method according to claim 1, wherein the generating comprises:

determining the object type of the virtual object based on the operation instruction; and generating the preset prompt identifier matching the object type, the preset prompt identifier including an attribute icon corresponding to the virtual object.

3. The information prompting method according to claim 2, wherein the generating the preset prompt identifier matching the object type comprises:

generating, based on the object type indicating an attack type, an attack identifier matching the attack type;

generating, based on the object type indicating an attack assist type, an attack assist identifier matching the attack assist type;

generating, based on the object type indicating a defense type, a defense identifier matching the defense type; and generating, based on the object type indicating a supply type, a supply identifier matching the supply type.

4. The information prompting method according to claim 1, wherein after the displaying the preset prompt identifier at the first position, the method further comprises:

automatically clearing the preset prompt identifier displayed at the first position based on a clear condition being met.

5. The information prompting method according to claim 4, further comprising:

determining that the clear condition is met based on at least one of (i) a deletion instruction for the preset prompt identifier being obtained, (ii) an association relationship being determined to be already established between the virtual object and the first virtual role, (iii) an association relationship being determined to be already established between the virtual object and the second virtual role, (iv) distances between all virtual roles in the team to which the first virtual role belongs and the first position all exceeding a first threshold, and (v) a display duration of the preset prompt identifier reaching a second threshold.

6. The information prompting method according to claim 1, further comprising:

obtaining a click instruction generated in response to a click operation on the virtual object, displaying the relationship establishment interface in response to the click instruction, and obtaining the operation instruction generated in response to the user selection of one of the plurality of mark options displayed in the relationship establishment interface.

7. The information prompting method according to claim 1, wherein the preset prompt identifier is displayed in a panoramic map and a local map, the local map including a subregion of the panoramic map in which the first virtual role is located.

8. The information prompting method according to claim 1, further comprising:

obtaining a moving track generated in response a movement operation in a human-computer interaction interface, the moving track being used to notify the second virtual role of an action track that the second virtual role is to refer to in a process of reaching the virtual object; and displaying the moving track in the human-computer interaction interface.

9. An information prompting method of a game application, the method comprising:

obtaining, by processing circuitry in a virtual scene displayed in a human-computer interaction interface corresponding to a first virtual role, a moving track generated by performing a movement operation in the human-computer interaction interface, the moving track being used to notify a virtual role of an action track that the virtual role in a team of the first virtual role is to refer to during task execution; and displaying, by the processing circuitry, the moving track in the human-computer interaction interface.

10. The information prompting method according to claim 9, further comprising:

notifying a second virtual role in the team of the first virtual role of a track type of the moving track, the track type including at least one of an attack track for indicating an attack, a retreat track for indicating a retreat, and a search track for indicating a search range.

11. The information prompting method according to claim 9, further comprising:

obtaining a clear instruction generated in response to selection of a clear button displayed in the human-computer interaction interface; and clearing, according to the clear instruction, the moving track currently displayed in the human-computer interaction interface.

12. The information prompting method according to claim 9, wherein before the obtaining, the method further comprises:

determining a third virtual role from all virtual roles in the team of the first virtual role; and displaying the moving track in a human-computer interaction interface corresponding to the third virtual role, the moving track not being displayed in a human-computer interaction interface corresponding to a virtual role other than the third virtual role in all the virtual roles in the team of the first virtual role.

13. The information prompting method according to claim 9, wherein the moving track is displayed in a panoramic map and a local map, the local map including a subregion of the panoramic map in which the first virtual role is located.

14. An information prompting apparatus, comprising:

processing circuitry configured to obtain an operation instruction in a virtual scene of a game application in which a first virtual role is located, the operation instruction being generated in response to a marking operation, by a user of the first virtual role, on a virtual object at a first position, the virtual object being used by the first virtual role to complete a task in the virtual scene;

generate, based on the operation instruction, a preset prompt identifier according to (i) an object type of the virtual object on which the marking operation is performed and (ii) a user selection of one of a plurality of mark options displayed in a relationship establishment interface, the preset prompt identifier being displayed to a second virtual role belonging to a same team as the first virtual role; and display the preset prompt identifier at the first position.

15. The information prompting apparatus according to claim 14, wherein the processing circuitry is configured to
   determine the object type of the virtual object based on the operation instruction; and
   generate the preset prompt identifier matching the object type, the preset prompt identifier including an attribute icon corresponding to the virtual object.

16. The information prompting apparatus according to claim 15, wherein the processing circuitry is configured to
   generate, based on the object type indicating an attack type, an attack identifier matching the attack type;
   generate, based on the object type indicating an attack assist type, an attack assist identifier matching the attack assist type;
   generate, based on the object type indicating a defense type, a defense identifier matching the defense type; and
   generate, based on the object type indicating a supply type, a supply identifier matching the supply type.

17. The information prompting apparatus according to claim 14, wherein the processing circuitry is configured to
   automatically clear, after the preset prompt identifier is displayed at the first position, the preset prompt identifier displayed at the first position based on a clear condition being met.

18. The information prompting apparatus according to claim 17, wherein the processing circuitry is configured to determine that the clear condition is met based on at least one (i) a deletion instruction being obtained, (ii) an association relationship is determined to be already established between the virtual object and the first virtual role, (iii) an association relationship being determined to be already established between the virtual object and the second virtual role, (iv) distances between all virtual roles in the team to which the first virtual role belongs and the first position all exceeding a first threshold, and (v) a display duration of the preset prompt identifier reaching a second threshold.

19. The information prompting apparatus according to claim 14, wherein the processing circuitry is configured to:
   obtain a click instruction generated in response to a click operation on the virtual object,
   display the relationship establishment interface in response to the click instruction, and
   obtain the operation instruction generated in response to the user selection of one of the plurality of mark options displayed in the relationship establishment interface.

20. The information prompting apparatus according to claim 14, wherein the preset prompt identifier is displayed in a panoramic map and a local map, the local map including a subregion of the panoramic map in which the first virtual role is located.

* * * * *